United States Patent
Jain et al.

(10) Patent No.: US 8,340,270 B2
(45) Date of Patent: Dec. 25, 2012

(54) IDENTIFICATION OF MULTIPLE PERSONS ON A PHONE CALL

(75) Inventors: Mukul Jain, San Jose, CA (US); Joseph F. Khouri, San Jose, CA (US); Laurent Philonenko, San Francisco, CA (US); Shmuel Shaffer, Palo Alto, CA (US); Paul J. Russell, Clinton, MA (US)

(73) Assignee: Cisco Technology, Inc., San Jose, CA (US)

( * ) Notice: Subject to any disclaimer, the term of this patent is extended or adjusted under 35 U.S.C. 154(b) by 1485 days.

(21) Appl. No.: 11/906,275

(22) Filed: Oct. 1, 2007

(65) Prior Publication Data

US 2009/0086943 A1 Apr. 2, 2009

(51) Int. Cl.
*H04M 3/42* (2006.01)
*H04M 1/64* (2006.01)
(52) U.S. Cl. ............... 379/207.15; 379/88.2; 455/415
(58) Field of Classification Search ............... 379/88.21, 379/142.06, 207.15; 455/415
See application file for complete search history.

(56) References Cited

U.S. PATENT DOCUMENTS

| | | | |
|---|---|---|---|
| 6,324,271 B1* | 11/2001 | Sawyer et al. | 379/142.05 |
| 2005/0094788 A1* | 5/2005 | Lipton et al. | 379/142.01 |
| 2006/0126816 A1* | 6/2006 | Shaffer et al. | 379/265.02 |
| 2007/0071203 A1* | 3/2007 | Boyer et al. | 379/158 |
| 2007/0206759 A1* | 9/2007 | Boyanovsky | 379/202.01 |
| 2007/0263853 A1* | 11/2007 | Pearson et al. | 379/413.03 |
| 2008/0159501 A1* | 7/2008 | Cai | 379/142.05 |
| 2008/0181379 A1* | 7/2008 | Chow et al. | 379/142.05 |
| 2008/0219426 A1* | 9/2008 | Lai | 379/202.01 |
| 2009/0025062 A1* | 1/2009 | Gustave et al. | 726/4 |
| 2009/0170519 A1* | 7/2009 | Wilhoite et al. | 455/436 |
| 2010/0194571 A1* | 8/2010 | Ortiz et al. | 340/572.1 |
| 2011/0261937 A1* | 10/2011 | Chmara et al. | 379/142.01 |

\* cited by examiner

*Primary Examiner* — Fan Tsang
*Assistant Examiner* — Solomon Bezuayehu
(74) *Attorney, Agent, or Firm* — Baker Botts L.L.P.

(57) ABSTRACT

A method in one embodiment includes receiving input identifying a plurality of callers within a listening or speaking range of a phone device being used to place a call. The input is then sent over a packet-based network to a server that authenticates and authorizes each of the callers to the call. Following authentication and authorization by the server, a name or caller ID of each of the callers is sent to a destination endpoint device of the call. It is emphasized that this abstract is provided to comply with the rules requiring an abstract that will allow a searcher or other reader to quickly ascertain the subject matter of the technical disclosure.

23 Claims, 4 Drawing Sheets

IDENTIFICATION OF MULTIPLE PERSONS ON A PHONE CALL

TECHNICAL FIELD

The present disclosure relates generally to the field of telephony; more particularly, caller identification (ID) systems for telephony networks.

BACKGROUND OF THE INVENTION

Caller ID is a common service offered by most telephone companies which determines and communicates the number/name of the calling party of an incoming call. Many modern telephone and telephony systems routinely offer this service, which is also known as Automatic Number Identification (ANI). Today, many communication systems provide messaging and conferencing services via packet-based networks, i.e., those that operate in accordance with the Internet Protocol (IP).

Extension Mobility (EM) is a feature that allows users to configure, on a temporary basis, any available IP Phone (appropriately equipped) as their own personal phone simply by logging in to that phone. Once a user logs in, the phone assumes the user's default device profile information, including line numbers, speed dials, services links, and other user-specific properties of a phone. For example, when user A occupies a desk and logs in to the phone, her directory number(s), services, speed dials, and other properties appear on that phone; but when user B uses the same desk at a different time and logs to the same phone, the phone assumes the new user's default device profile and his information appears. The EM feature also allows a called party know who is calling irrespective of where the user is calling from (e.g., office lobby, different cubicle, break room, etc.) or what phone device is being used to place that call. This approach is particularly useful in work environments in which employees do not routinely conduct business in the same place every day.

BRIEF DESCRIPTION OF THE DRAWINGS

The present disclosure will be understood more fully from the detailed description that follows and from the accompanying drawings, which however, should not be taken to limit the invention to the specific embodiments shown, but are for explanation and understanding only.

DESCRIPTION OF EXAMPLE EMBODIMENTS

Figure 1:
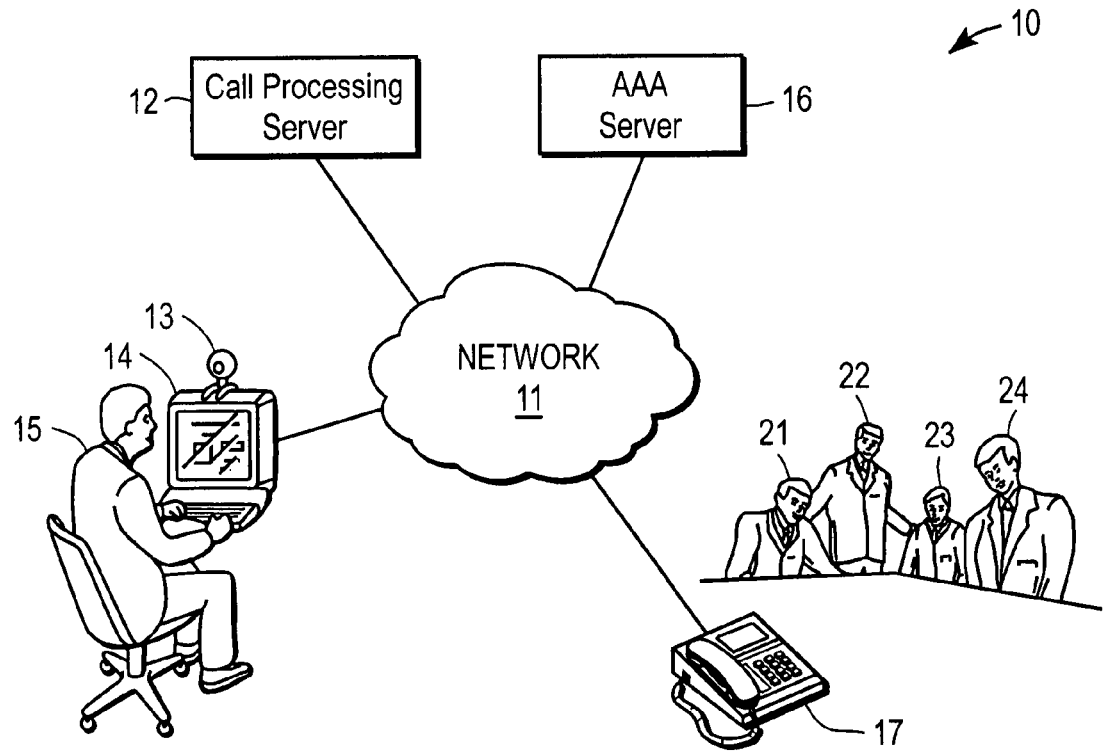
FIG. 1 example communications system facilitating a call between two remote endpoint devices.

In the following description specific details are set forth, such as device types, system configurations, protocols, methods, etc., in order to provide a thorough understanding of the disclosure herein. However, persons having ordinary skill in the relevant arts will appreciate that these specific details may not be needed to practice the embodiments described.

In the context of the present application, a communication network is a geographically distributed collection of interconnected subnetworks for transporting data between nodes, such as intermediate nodes and end nodes (also referred to as endpoints). A local area network (LAN) is an example of such a subnetwork; a plurality of LANs may be further interconnected by an intermediate network node, such as a router, bridge, or switch, to extend the effective "size" of the computer network and increase the number of communicating nodes. Examples of the endpoint devices or nodes may include servers, VoIP phones, Session Initiation Protocol (SIP) phones, video conferencing units, video terminals, Personal Digital Assistants (PDAs), and personal computers. The nodes typically communicate by exchanging discrete frames or packets of data according to predefined protocols.

A communication or conferencing system, as those terms are used herein, both comprise software and/or hardware (including firmware) components integrated so as to facilitate the live exchange of voice and, in certain implementations, other information (audio, video and/or data) among persons participating via endpoint devices at different remote locations. A call or conference session may involve point-to-point or multipoint calls over a variety of network connections and protocol types.

An endpoint is a device that provides media communications termination to an end user, client, or person who is capable of participating in a telephony call or in an audio conference session via a communication system. Endpoint devices that may be used to initiate or participate in a call or conference session include a mobile phone, a personal digital assistant (PDA), a voice over Internet protocol (VoIP) phone, a personal computer (PC), such as notebook, laptop, or desktop computer; an audio/video appliance; or any other device, component, element, or object capable of initiating or participating in audio exchanges with a telephony or conferencing system.

Overview

According to one embodiment, a mechanism is provided that communicates to a called party the caller IDs (e.g., names/numbers) of multiple persons participating or listening in on call placed from a single phone or endpoint device. In various embodiments described herein, a Graphical User Interface (GUI)/Telephony User Interface (TUI) may be utilized on a caller endpoint device for adding multiple callers to a call with proper authentication and authorization.

In accordance with a specific embodiment, a new GUI button (e.g., "Add Caller") is displayed when the phone handset is lifted off hook. The GUI button may be implemented as either a soft key on the phone UI or a hardware button. Upon pressing the "Add Caller" button the user is prompted to enter new caller ID information to be associated with the current call. At this point the user can either enter his user ID and password combination, or the phone number and personal identification number (PIN) for his caller ID to be associated with the call. The information collected from the above steps is then sent to an Authentication Authorization Accounting (AAA) server.

Upon confirmation from the AAA server, which includes the standard formatted caller ID information, the phone device associates the additional caller ID of the user to the call. The "Add caller" button can be pressed repeatedly to associate additional users to the call. Once the call is placed, the caller ID information for all the persons present or participating on the call is communicated to the other endpoint device(s). In other words, when the call is presented (i.e., rings) on the callee's phone device, the multiple caller IDs are displayed. The called party may use this information to make an informed decision about whether to answer the call.

Referring to FIG. 1, an example communications system 10 is shown that includes a call processing server 12 and an AAA server 16 connected via a network 11 with endpoint devices 14 & 17. Endpoint 14 comprises a personal computer (PC) with built-in telephone communication capabilities. FIG. 1 shows PC 14 associated with a user 15. PC 14 may also be associated with video camera 13 which can be used to facilitate video conferencing. Endpoint 17 is an IP phone located in an office or conference room. A group of individuals (i.e., users 21-24) are shown gathered within listening or speaking range of a phone 17 for the purpose of participating in a conference with user 15.

Call processing server 12 may comprise a software-based call-processing application, such as a version of Cisco's CallManager™ application, that provides signaling and call control services, distributes calls and features over IP network 11. In certain embodiments, the call processing component or application may reside on or be integrated into a variety of different nodes or devices connected to network 11. For example, the call processing component shown running on server 12 may run on a voice gateway, switch, router, or Private Branch Exchange (e.g., IP-PBX) used to facilitate communication amongst endpoints attached to network 11. In still other cases, the call manager function may run on the IP-enabled endpoint or phone devices themselves.

AAA server 16 comprises an authentication server used for network access control, i.e., to authenticate each person present on the call. The authentication function identifies the caller/user, whereas the authorization function implements policies that determine which resources and call services a valid user may access. The authorization function may be utilized, for example, to restrict calls made to certain countries when persons other than high-level managers are present in the room. The accounting function keeps track of time and data resources used, e.g., for purposes of billing and analysis.

In the embodiment shown, when user 21 of phone 17 picks up the handset or otherwise presses the speaker button to place a call to user 15, a GUI or TUI (e.g., an interactive voice response (IVR) system) immediately prompts the other persons present on the call (users 22-24) to individually enter their phone extension number followed by a secret PIN or passcode. This information is then sent to AAA server to authenticate each person for the call. Once authenticated or validated, the call is allowed to connect with the callee's phone, with the caller ID information of users 21-24 is then sent to PC 14 so that user 15 may see the name of each person participating in the conference call. In another embodiment, the system does not prompt the caller to enter the names of the other participants unless the first caller presses the hardware button, or a soft button, "Add Users".

In the example scenario shown, IP phone 17 is an office phone assigned to or associated with user 21 (Mike). User 22 (Joseph) is a Group Director who, along with users 23 & 24 (James & Bob), has stopped by Mike's office to discuss a high priority customer issue. During their discussion they decide to consult with user 15 (Chris), and therefore place a call to him from IP phone 17. Chris, who is busy working on another high priority task, might ordinarily ignore Mike's call and let it be forwarded to his voicemail. But when Chris sees on the screen of PC 14 that the incoming call is from Mike, Joseph, James and Bob, he decides to answer the call.

In addition to manually filtering calls, as described above, automated call filtering functions may be executed by standard call filter engines such as PA (Personal Assistance) systems running on PC 14, or on any other PC or server attached to network 11. Various filters rules can be applied when multiple caller IDs are associated to a call from an endpoint device. For example, Chris may configure a filtering rule on his PC wherein calls from Joseph are always allowed, such that anytime Joseph is present on the call, the call is to be presented. Another possible rule may be to send calls from Mike to voicemail (rather than alert the phone about the incoming call) except when Joseph is present on the call.

In a particular implementation, the GUI/TUI provides the caller with the ability by to re-organize the order of the caller IDs. In the example given above, for instance, the caller ID order may be arranged as Joseph, James, Bob, and Mike before placing the call. The called party, i.e., Chris, may apply different call filtering rules based on the order of the caller ID information. For instance, if the first caller listed is Joseph, or if Joseph is present in first three callers listed, then the call is to be accepted; otherwise, the call is not accepted or is transferred to Chris' voicemail messaging system.

In yet another example embodiment, the system may utilize the directory to automatically arrange the order of the callers alphabetically, in order of their rank, seniority or any other specified criteria.

Figure 2:
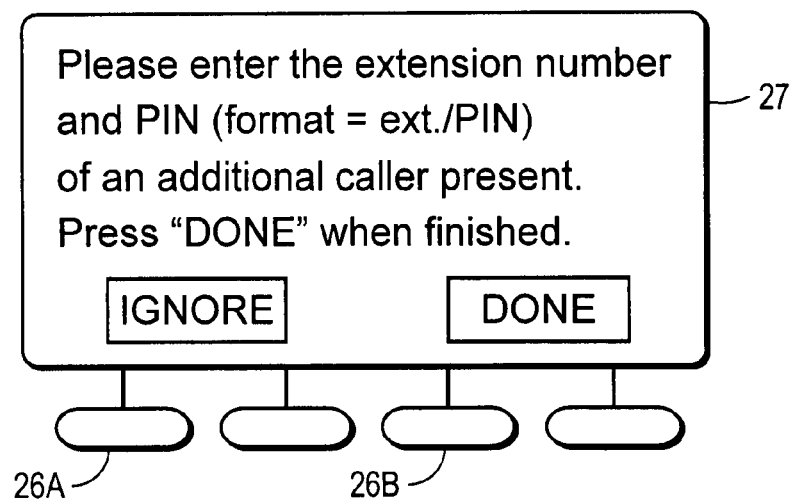
FIG. 2 illustrates an example graphical user interface (GUI) window for the phone shown in FIG. 1.

FIG. 2 illustrates an example GUI window 27 for the IP phone 17 (or PC 14) shown in FIG. 1. Window 27 may be used in conjunction with the phone's softkey buttons (e.g., buttons 26A & 26B) for entering caller ID information of additional persons present on a call. Practitioners in the art will understand that the window 27 may be generated by graphical user interface software (i.e., code) running a user's phone or other endpoint device. In other cases, the GUI may comprise a collaborative web-based application that is accessed by the browser software running on an endpoint. In other instances, the GUI may comprise a downloaded application (e.g., downloaded from server 12) or other forms of computer-executable code that may be loaded or accessed by a user's phone, PC, or other endpoint device. For instance, the software code for implementing the GUI may be executed on server 12 and accessed by a user's phone when the user opens a line (goes "off hook") to place a call.

As can be seen, when a user picks up the telephone handset or otherwise opens a line to place a call (e.g., presses a speakerphone or conference call button), window 27 appears to prompt the user to enter an extension number of an additional person who may be present in the room. If nobody else is present, the user may press softkey button 26A in order to ignore the additional person validation process and simply proceed with the call. Alternatively, if another person (besides the primary caller) is present on the call, the additional caller enters their extension number followed by a secret PIN or passcode that uniquely identifies that individual within the organization.

After entering the information in the requested format (e.g., extension & PIN) the additional caller presses softkey button 26B ("Done') which causes his information to be communicated to AAA server 16 for authentication and authorization. Upon confirmation from the AAA/central server, which includes the standard formatted caller ID information, the caller's phone or endpoint device associates the additional caller ID to the call. A new GUI window may then appear on the display screen of the IP phone giving the user the option to enter the extension number of any additional persons present on the call. That is, the "Add caller" button can be pressed again to repeat above steps to associate additional users to the call. The multiple caller IDs are then displayed on a display screen or monitor of the callee's endpoint device (e.g., PC 14) when the call is finally presented, i.e., when the phone rings.

In another embodiment, a dedicated "Add Caller" button may be provided on the phone such that GUI window 27 appears on the display screen in response to the "Add Caller" button being pressed.

In another variation of the example embodiment described above, Mike's phone may be associated to his PC, and Joseph, James, and Bob may each utilize Mike's PC to add their caller IDs to the outgoing call. Again, the entered information is sent to AAA server 16 for authentication and authorization purposes. In still another embodiment, Joseph may associate his PC/laptop with Mike's phone device using a wired or wireless (e.g., Bluetooth, 802.11, infrared, etc.) connection. Joseph may then use his own PC/laptop to enter his extension number and PIN information, which is then submitted it AAA server 16 for adding his caller ID to outgoing call.

Figure 3:
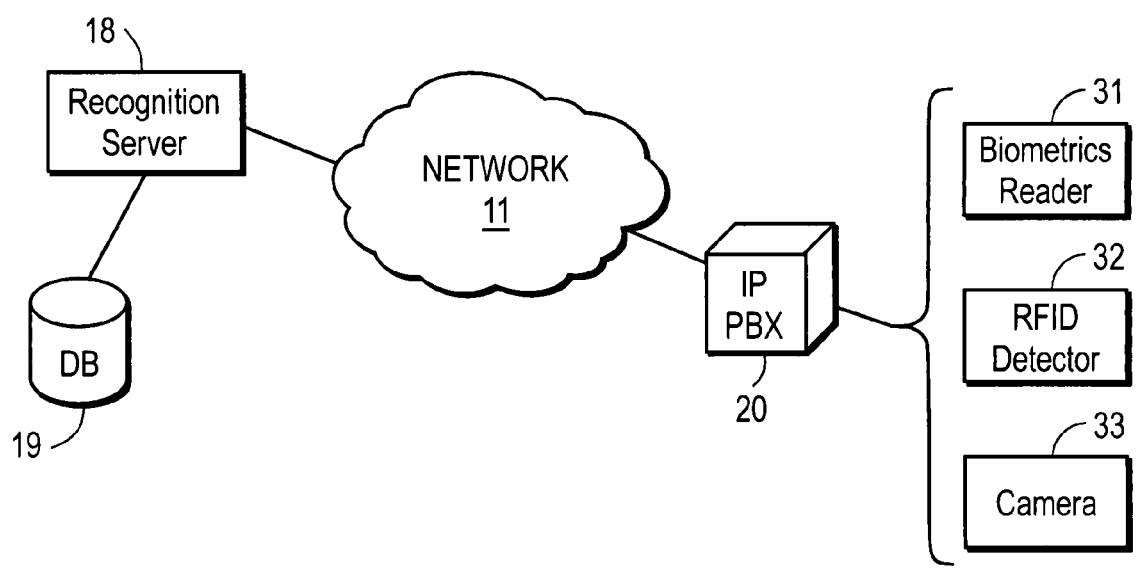
FIG. 3 illustrates an example communications system configured for automatic identification of multiple persons on a call.

Rather than having users manually enter their caller ID information, the identification, authentication, and authorization processes for adding caller IDs to a call may be completely automatic. In other words, manual entering of extension numbers or other caller ID information is unnecessary since one or more recognition or identification systems may be employed to identify, authenticate, and authorize individuals present on a call. By way of example, FIG. 3 illustrates a communications system configured for automatic identification of multiple persons on a call. In the example shown, a number of different devices are shown coupled with an IP-PBX system 20, which, in turn, is shown attached to network 11. A recognition server 18 (e.g., an AAA server) is also shown attached to network 11. Recognition server 18 is connected with a database 19 that stores identification and profile information of individuals within the organization.

In the example of FIG. 3, a biometric reader 31 (e.g., fingerprint reader), RFID detector 33, and a camera 33 are shown coupled with IP-PBX 20 for automatically identifying multiple persons on a call when a user of a phone or other endpoint device goes off hook to place a call. For example, when the user picks up the phone to place a call, a GUI/TUI may prompt the user to have each of the people present in the room scan their fingerprint using a fingerprint reader, or other type of biometric reader device 31.

Alternatively, an RFID detector 31 may be placed in the user's office or conference room (e.g., in the doorway), such that when a call is being placed the RFID detector automatically scans an RFID tag embedded in each person's work badge, mobile phone, laptop, etc. Scanning may also be performed automatically as each person enters the room, with the scanned information being forwarded to an AAA server as part of the call initiation process.

In still another example embodiment the system utilizes a smartcard reader to read a smartcard or ID card (e.g., a work badge) of each person present or close to the originating caller.

Still another possibility is to utilize a camera 33 to capture facial images of each person present in the room prior to a call being placed or connected. Facial recognition technology can be used to recognize the face(s) of the people near the calling device (e.g. video phone) and use that to automatically populate the caller ID with IDs of all the individuals nearby to the calling device. For example, if Joseph, Mike, James and Bob are sitting in Mike's office, when a call is initiated from Mike's office phone, a camera in Mike's office (e.g., mounted on his video phone or PC) captures the facial images of everyone present or close to the originating caller. Server 18, for example, may include a facial recognition software module that may be used to pick someone's face out of an image, extract that face from the rest of the scene, and compare it to a catalog of facial images stored in database 19. By way of example, a software program such as FaceIt™ sold by Identix, Inc., of Minnetonka, Minn., or facial recognition programs sold by Viisage Technology of Littleton, Mass., may be used to analyze images of human faces for the purpose of identifying them.

Yet another possibility is to utilize a wireless access point in the office or conference room to detect the presence of an employee's laptop computer, PDA, or mobile phone device when a call is being placed. Known triangulation techniques may also be utilized to determine when an individual is present or nearby when a conference call is placed to another party.

Regardless of what type of apparatus is utilized, once the identification information (e.g., fingerprint, facial image, RFID, wireless presence, etc.) of the individuals present on the call has been automatically obtained, it is sent to recognition server 18 for authentication and/or authorization purposes. That is, recognition server 18 may access database 19 to authenticate the identity of each person detected, and also to authorize each person's presence and/or participation on the call. Once everybody present on the call has been identified, authenticated, and/or authorized, the actual call is placed to the called party by IP-PBX system 20. A list of the names and/or other ID information of each person present on the call is then visually provided on a display screen of the called party's endpoint device.

In another example embodiment, the system announces the names of the callers by playing a voice prompt with the callers' names or playing a special tone for each caller.

In one embodiment, the list of names or caller ID information may be displayed to the callee both prior to pickup or answering a call, as well as after the callee has answered the call. This allows the callee to appropriately screen the incoming call and also know who is continually present throughout the duration of the call. For instance, during the call Joseph may walk out of the office or conference room, which event is detected automatically by, say, RFID detector 32. At that point, a list of names displayed on the called party's endpoint device is automatically updated in real-time, such that Joseph's name is no longer listed as being present on the call. In this manner, the callee always knows the names or caller IDs of everyone who is currently present on the call. In a particular implementation, a log of the persons present on the conference call may be stored in a database for recordkeeping or archival purposes. Additionally, the called party's endpoint device may generate an alert message (visual, audible, text, etc.) notifying the callee of the change in who is currently present on the conference call.

Figure 4:
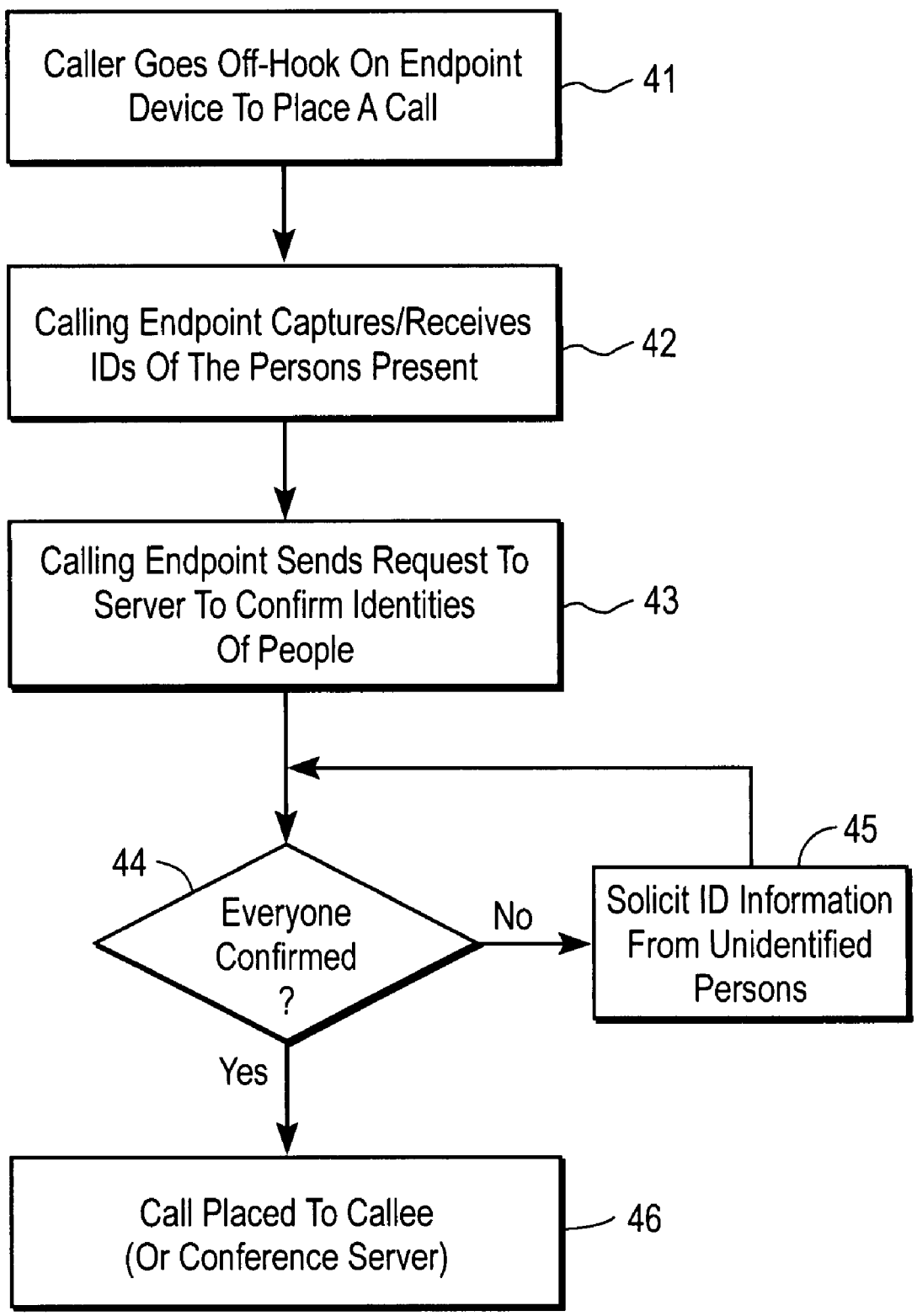
FIG. 4 illustrates an example method of operation for a system configured for communicating caller IDs of multiple persons on a call to a called party.

FIG. 4 illustrates an example method of operation for a system configured for communicating caller IDs of multiple persons on a call to a called party. The process begins with the user/caller going off-hook on his endpoint device in order to place a call to another party (e.g., person-to-person) or to a conferencing server or other device used to register multiple callers to a conference call (block 41). Prior to the call being connected to the callee, the system either automatically captures the ID information from each person present on the call, or prompts the caller to have each person present on the call enter their extension number & PIN information, as described above. This step is shown occurring in block 42. This information is then sent or forwarded from the calling endpoint to a recognition and/or AAA server (block 43). The server may be utilized to confirm the identities of each person present on the call, as well as to authenticate and authorize their attendance/participation on the call.

Once everyone present on the call has been authorized or confirmed (block 44), the call is placed to the callee's endpoint device or conferencing server handling the call (block 46). In the event that an unidentified person is detected as being present, the system may solicit certain ID information prior to connecting the call. For example, an outside vendor or contractor (Ed) may be present in the originating caller's office and the system's database may not have an entry or record of that person. In such a case, the GUI/TUI may ask Ed to identify his company or firm, his full name, and other information prior to connecting the call (block 45). In the case of unidentified individuals, the originating call may also be asked to specifically authorize that person's presence on the call.

Figure 5:
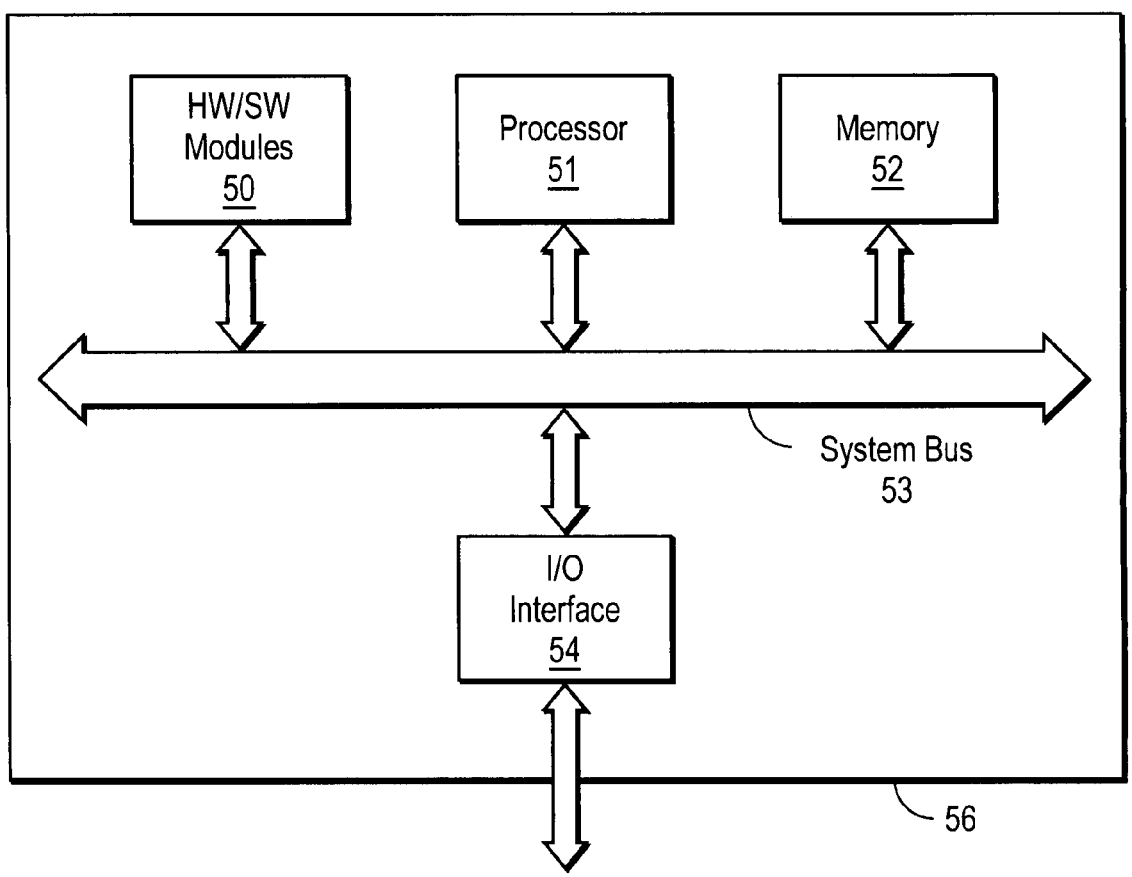
FIG. 5 illustrates an example network node or device.

FIG. 5 is a generalized block diagram showing an example network device or node 56, such as may comprise any of the systems, devices, or nodes (e.g., a PC or server) shown or described above. Node 56 includes a processor subsystem 51 coupled with a memory unit 52, one or more hardware/software modules 50, and an input/output (I/O) interface 54 via a system bus 53. Modules 50 may include software, firmware, or logic embedded in hardware for implementing any of the functions described herein, e.g., those functions associated including adding multiple caller IDs to a call, etc. In one example implementation, bus 53 may be replaced with a high-speed network (e.g., network 11 in FIG. 1) and the components mentioned above are distributed, attached to and communicate through the high-speed network.

It is appreciated that any caller ID system utilized by or in conjunction with node 56 may comprise separate hardware devices coupled to the system bus 53, or, alternatively, implemented as software programs or modules 50 that run on one or more processors of subsystem 51. In other words, the various functions described above may be implemented as separate hardware devices, memory locations (storing executable code), firmware devices, software modules, or other machine-readable devices. (In the context of the present application, therefore, the term "module" is to be understood as being synonymous with both hardware devices and computer-executable software code, programs or routines.)

It should be further understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, elements of the present invention may be downloaded as a computer program product, wherein the program may be transferred from a remote computer or telephonic device to a requesting process by way of data signals embodied in a carrier wave or other propagation medium via a communication link (e.g., a modem or network connection).

Additionally, although the present invention has been described in conjunction with specific embodiments, numerous modifications and alterations are well within the scope of the present invention. For instance, although functions and methods of various embodiments have been described as being embodied on a call processing or recognition server, it is appreciated that these same methods and functions may be embodied on an endpoint device of a user, another server (e.g., a conferencing sever), a call processing application running on a different client device, or a third party service application program accessible via a web-based browser. Accordingly, the specification and drawings are to be regarded in an illustrative rather than a restrictive sense.

We claim:

1. A method comprising:
   receiving, by a telephone device assigned to a first caller, information identifying one or more additional participants present on a call placed to a callee from the telephone device; and
   sending the information over a packet-based network to a node that authenticates the one or more additional participants;
   wherein, upon authentication by the node, a name or caller ID of each of the one or more additional participants is sent to a telephone device of the callee for display thereon prior to the call being answered by the callee.

2. The method of claim 1 wherein the name or caller ID of each of the one or more additional participants is sent from the telephone device associated with the caller.

3. The method of claim 1 wherein the name or caller ID of each of the one or more additional participants is sent from the node.

4. The method of claim 1 wherein the node comprises a server attached to the packet-based network.

5. The method of claim 1 wherein the node comprises an Authentication Authorization Accounting (AAA) server.

6. The method of claim 1 further comprising prompting, via a graphical or telephony user interface, the one or more additional participants to each manually enter the information.

7. The method of claim 1 wherein the information comprises a phone extension number and a passcode or personal identification number.

8. The method of claim 1 wherein the receiving comprises electronically detecting, for each of the one or more additional participants, an article or apparatus identifying one or more the additional participants in a physical location at or near where the telephone device is located.

9. The method of claim 1 wherein the receiving comprises:
   electronically capturing a facial image of each of the one or more additional participants; and
   sending the facial image to a recognition server in an attempt to match the facial image with one of a plurality of stored facial images.

10. A method comprising:
    receiving, by a telephone device, input identifying a plurality of participants to place a call;
    sending the input over a packet-based network to a server that authenticates each of the participants to the call; and
    sending, following authentication by the server, a name or caller ID of each of the participants to a destination endpoint device of the call.

11. The method of claim 10 wherein the name or caller ID of each of the participants is displayed on a screen of the telephone device while the call is ringing.

12. The method of claim 10 wherein the name or caller ID of each of the participants is displayed on a screen of the telephone device after the callee answers the call.

13. The method of claim 10 wherein the receiving and sending is performed by an Internet Protocol Private Branch Exchange (IP-PBX).

14. The method of claim 10 wherein the receiving and sending is performed by the phone device.

15. The method of claim 10 wherein the input comprises a phone extension number and a passcode or personal identification number of each of the participants.

16. The method of claim 10 wherein the receiving comprises electronically reading, for each of the participants, digital information embedded in tag or card identifying the participant.

17. The method of claim 10 wherein the receiving comprises receiving an electronically-captured facial image of each of the participants.

18. The method of claim 17 wherein the sending comprises sending the electronically-captured facial image of each of the participants to the server, the server, in response, initiating a database query in an attempt to match the facial image with one of a plurality of stored facial images, in the event of a match between a particular stored facial image and the facial image, the server retrieving the information associated with the particular stored facial image.

19. The method of claim 11 wherein the destination endpoint device comprises a telephone device.

20. The method of claim 11 wherein the destination endpoint device comprises a conferencing server.

21. An apparatus comprising:
a display; and
a program that runs on a communication device associated with the display to produce a graphical user interface (GUI) on the display, the GUI providing a user of the communication device with an ability to enter additional caller ID information of additional persons to be added on a call being placed from the communication device, the communication device being operable to send the new caller ID information to a server connected with the communication device over a network, in response to receiving the new caller ID information, the server for authenticating each of the additional persons to be added on the call, wherein, once authenticated, a name or caller ID of each of the additional persons is sent to a telephone device of the callee for display thereon prior to answering of the call.

22. The apparatus of claim 21 further comprising a selectable button that invokes the GUI on the display.

23. The apparatus of claim 21 wherein the additional caller ID information comprises an extension number and passcode of each of the persons.

* * * * *